United States Patent
Yamauchi et al.

(10) Patent No.: US 7,312,923 B2
(45) Date of Patent: Dec. 25, 2007

(54) VIEW FIELD FRAME POSITION ADJUSTABLE OPTICAL DEVICE

(75) Inventors: Katsushi Yamauchi, Kawasaki (JP); Shunichi Haga, Kodaira (JP)

(73) Assignees: Nikon Vision Co., Ltd., Tokyo (JP); Nikon Corporation, Tokyo (JP)

( * ) Notice: Subject to any disclaimer, the term of this patent is extended or adjusted under 35 U.S.C. 154(b) by 146 days.

(21) Appl. No.: 10/548,437

(22) PCT Filed: Mar. 10, 2004

(86) PCT No.: PCT/JP2004/003073

§ 371 (c)(1),
(2), (4) Date: Sep. 9, 2005

(87) PCT Pub. No.: WO2004/081633

PCT Pub. Date: Sep. 23, 2004

(65) Prior Publication Data

US 2006/0193039 A1    Aug. 31, 2006

(30) Foreign Application Priority Data

Mar. 10, 2003   (JP) ............................... 2003-063862

(51) Int. Cl.
G02B 23/00   (2006.01)
G02B 21/36   (2006.01)

(52) U.S. Cl. ...................................... 359/413; 359/363

(58) Field of Classification Search ................ 359/363, 359/410–417, 480, 482
See application file for complete search history.

(56) References Cited

U.S. PATENT DOCUMENTS 7,164,528 B2 * 1/2007 Mogamiya .................. 359/412

(Continued)

FOREIGN PATENT DOCUMENTS

JP       9-258111       10/1997

(Continued)

OTHER PUBLICATIONS

Partial translation of JP 2002-182272-A having paragraphs [0049]-[0052], Japanese language document previously submitted.

(Continued)

*Primary Examiner*—Alessandro Amari
(74) *Attorney, Agent, or Firm*—Morgan, Lewis & Bockius

(57) ABSTRACT

An optical apparatus that can take an image at any inclination. Further, the optical apparatus is provided with a function that a user can know the inclination. A visual field frame having the same shape as an imaging unit is provided in a lens-barrel such that the visual field frame can rotate, being interlocked with rotation of the imaging unit. Further, the optical apparatus is provided with a function of detecting rotation of the imaging unit itself interlocked with rotation of the visual field frame and rotation of the imaging unit caused by rotation of the lens-barrel at the time of adjusting the pupil distance or the like. At recording, an image is recorded in an inclined state adapted for the rotation of the imaging unit. As a result, even if the imaging unit is inclined contrary to the user's will at the time of adjusting the pupil distance, the imaging unit can be returned to be horizontal by rotating the visual field frame.

8 Claims, 9 Drawing Sheets

U.S. PATENT DOCUMENTS

2001/0028498 A1* 10/2001 Haga et al. ................ 359/407

FOREIGN PATENT DOCUMENTS

| JP | 11-218692 | 8/1999 |
|---|---|---|
| JP | 2001-281555 | 10/2001 |
| JP | 2002-116386 | 4/2002 |
| JP | 2002-182272 | 6/2002 |

OTHER PUBLICATIONS

Partial translation of JP 2001-281555-A having paragraph [0044], Japanese language document previously submitted.

Translation of JP 11-218692, Japanese language document previously submitted.

* cited by examiner (a)

(b)

(a)

(b)

VIEW FIELD FRAME POSITION ADJUSTABLE OPTICAL DEVICE

TECHNICAL FIELD

The present invention relates to a pair of binoculars, and particularly to a pair of binoculars having an image pickup function.

BACKGROUND ART

An optical apparatus such as a pair of binoculars or a microscope is usually used for an observer to observe an object with his eye. Recently, there is proposed an optical apparatus having an image pickup function for recording an observed image. Such an optical apparatus has an imaging unit arranged in the main body of the apparatus.

Generally, a conventional binocular optical apparatus is structured such that the interpupillary adjustment is performed by rotating the left and right lens-barrels on the spindle. Further, in the case of an optical apparatus having an image pickup function, a visual field frame of an oblong rectangular or ellipsoidal shape corresponding to a shape of the image pickup device is displayed in the visual field, for discriminating between the observed image and the image pickup record area.

However, in the case where the interpupillary adjustment is performed is adjusted as described above, there is a problem that the visual field frame is inclined. Further, in the case where an imaging unit is arranged in the main body of a pair of binoculars, not only the visual field frame but also the imaging unit is inclined when the interpupillary adjustment is performed.

To solve the problems, have been considered a mechanism by which rotation of one lens-barrel makes the other lens-barrel rotate through the same degrees in the reverse direction to keep the imaging unit always horizontal in service condition, and a mechanism according to which the visual field frame is mounted rotatably about the optical axis of the optical system of a lens-barrel portion to correct the inclination of the visual field frame (See, for example, Japanese Non-examined Patent Laid-Open No. 2001-281555 (Patent Document 1)).

DISCLOSURE OF THE INVENTION

However, according to the mechanism of Patent Document 1, it is necessary to provide gears and rods between the left and right lens-barrels so that the left and right lens-barrels are interlocked during the interpupillary adjustment while keeping the imaging unit always horizontal. As a result, the optical apparatus itself becomes larger, and high accuracy is required for its component parts.

An object of the present invention is to provide an optical apparatus such as a pair of binoculars or a microscope in which a visual field frame indicating an image pickup range is displayed in the visual field and inclinations of an imaging unit and the visual field frame can be easily adjusted.

To attain the above object, an optical apparatus of the claim 1 comprises: a binocular optical system that has a left and right pair of observation optical systems housed respectively in left and right lens-barrels, and is able to perform the interpupillary adjustment by axially rotating the left and right lens-barrels; an imaging unit that has a photoelectric conversion unit having an angle of view corresponding to a real visual field of an image observed by the binocular optical system, with the imaging unit being arranged between the left and right lens-barrels; and a visual field frame that has almost the same shape as the photoelectric conversion unit, is provided in at least one of the lens-barrels to be rotatable about an optical axis of the observation optical system; wherein: the optical apparatus further comprises: an interlocking portion provided between the lens-barrel having the visual field frame and the imaging unit, with the interlocking portion rotate the visual field frame and the imaging unit in the same direction through the same angle.

An optical apparatus of the claim 2 further comprises: a detection means that detects a quantity of rotation of the photoelectric conversion unit about an optical axis of an image pickup optical system of the imaging unit; a display means; and a control means that makes the display means give an indication when the quantity of rotation of the imaging unit, which is detected by the detection means, becomes a predetermined value.

An optical apparatus of the claim 3 is characterized in that the predetermined value is a value indicating that an inclination of long sides of the imaging unit is horizontal or vertical.

An optical apparatus of the claim 4 comprises a binocular optical system that has a left and right pair of observation optical systems housed respectively in left and right lens-barrels, and is able to perform the interpupillary adjustment by axially rotating said left and right lens-barrels; an imaging unit that has a photoelectric conversion unit having an angle of view corresponding to a real visual field of an image observed by the binocular optical system, with the imaging unit being arranged between the left and right lens-barrels; and a visual field frame that has almost the same shape as the photoelectric conversion unit, is provided in at least one of the lens-barrels to be rotatable about an optical axis of the observation optical system; wherein: the optical apparatus further comprises: a detection means that detects a quantity of rotation of said photoelectric conversion unit about an optical axis of an image pickup optical system of the imaging unit; a driving unit that drives rotation of said photoelectric conversion unit and/or rotation of the visual field frame; and a control unit that makes said driving unit operate, based on information detected by the detection means.

And, an optical apparatus of the claim 5 is characterized in that, as the driving unit, separate driving units are provided for rotating the photoelectric conversion unit and the visual field frame respectively; the driving unit for driving rotation of the photoelectric conversion unit is provided between the left and right lens-barrels; and the driving unit for driving rotation of the visual field frame is provided in the lens-barrel in which the visual field frame is provided.

BEST MODE FOR CARRYING OUT THE INVENTION

First Embodiment

Figure 1:
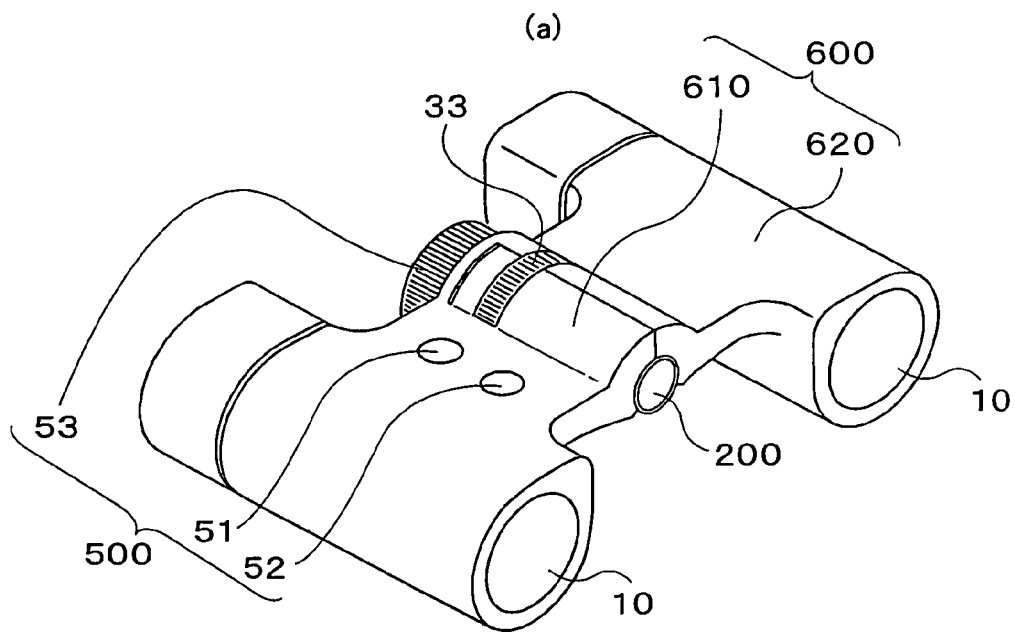
FIG. 1(a) is an external view showing a pair of binoculars according to an embodiment of the present invention, and FIG. 1(b) a schematic view showing inner structure of the binoculars of the present embodiment.
Figure 1:
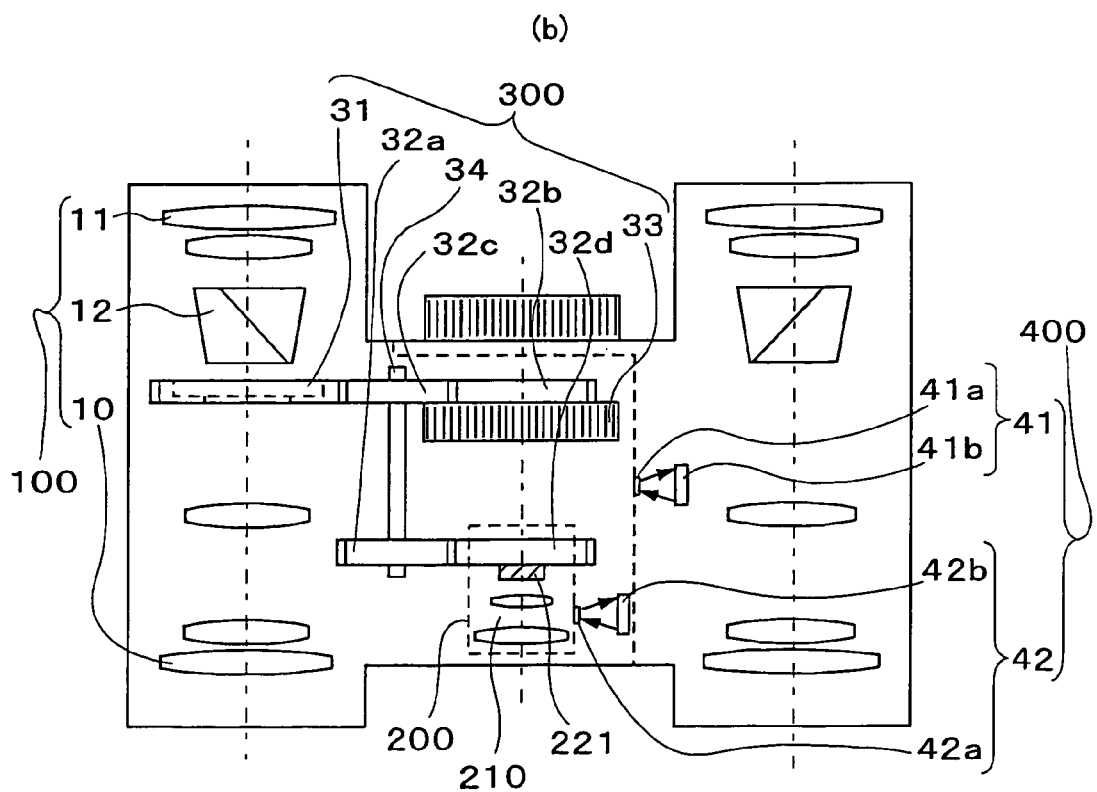

Now, embodiments of the present invention will be described referring to the drawings.

These embodiments will be described taking a pair of binoculars as an example of an optical apparatus. However, the present invention can be applied to other optical apparatuses such as a microscope other than a pair of binoculars. Further, the mechanism for adjusting the inclination of the imaging unit and the visual field frame can be applied to a monocular apparatus too.

FIG. 1(a) is an external view showing a pair of binoculars according to an embodiment of the present invention, and FIG. 1(b) a schematic view showing inner structure of the binoculars.

As shown in FIGS. 1(a) and 1(b), the binoculars of the present invention are provided with a binocular optical system 100 having a left and right pair of observation optical systems for observing an object; an imaging unit 200 for taking a picture; a mechanical unit 300 for interlocking the imaging unit 200 and a visual field frame that delimits an observation area; a detection unit 400 for detecting an inclination of the imaging unit; an operation unit 500 for receiving input of an operation instruction; and a housing 600 that stores the above-mentioned components.

As outlined in FIG. 1(b), each observation optical system of the binocular optical system 100 is provided with an objective lens 10, an eyepiece 11 and an erect prism 12, and these components are housed in a lens-barrel.

The imaging unit 200 is arranged in the middle of the binocular optical system 100, and is provided with an image pickup optical system 210, a photoelectric conversion unit (CCD) 221, a control board, a recording unit, a battery box (not shown), and the like. The image pickup optical system 210 comprises a lens system having an angle of view that realizes a visual field corresponding to the real visual field owing to the binocular optical system, and is arranged to generate and record an image that is close to an image generated by the binocular optical system 100.

The mechanical unit 300 is provided with the visual field frame 31, a rotatable knob 33, gears 32a, 32b, 32c and 32d and a coupling gear shaft 34.

The visual field frame 31 is fundamentally the same as the conventional one, and, in the following, will be described taking one of a quadrangular (rectangular) shape as an example. The visual field frame 31 is defined as horizontal when the long sides of the rectangular frame 31 are in the horizontal direction. And, the visual field frame 31 is defined as vertical when the short sides of the frame 31 are in the horizontal direction.

Further, in the present embodiment, the visual field frame 31 is placed in front of the erect prism 12. However, visual field frames 31 may be placed in front of left and right erect prisms 12 respectively. Further, the visual field frame 31 may be placed in any position in the binocular optical system 100.

As shown in FIG. 1(a), the rotatable knob 33 is rotatably fixed to the housing 600 at an exposed position so that a user can rotate the knob 33. However, frictional force is applied to the rotatable knob 33 so that the rotatable knob 33 does not move easily. Rotation of the rotatable knob 33 is transmitted to the visual field frame 31 through the gear 32c, and to the circumferential gear portion 32d of the imaging unit 200 through the coupling gear shaft 34 and the gear 32a.

According to this arrangement in the present embodiment, the user can rotate the visual field frame 31 and the imaging unit 200 simultaneously through the same angle in the same direction.

The detection unit 400 is provided with a lens-barrel rotational position detection unit 41 and an imaging unit rotational position detection unit 42. The imaging unit rotational position detection unit 42 can detect the rotational position of the visual field frame also, since the imaging unit rotational position detection unit 42 is connected through the gears. Details of each unit will be described later.

As shown in FIG. 1(a), the operation unit 500 comprises: a power button 51 for receiving an instruction of turning-on/off the power of the imaging unit; a record button 52 for receiving an instruction of timing the moment to take a still picture; and a focus knob 53 for receiving an instruction of adjusting the focus.

FIGS. 2(a), 2(b), 2(c) and 2(d) are views for explaining a method of detecting the inclination of the visual field frame 31 and the imaging unit 200 and adjustment operation at the time of the interpupillary adjustment.

As shown in the figures, the housing 600 is provided with: a first housing 610 that houses the imaging unit 200 and the observation optical system on the side where the visual field frame 31 exists; and a second housing 620 that houses the other observation optical system and is rotatably coupled to the first housing 610 at its part where the imaging unit 200 is housed.

As described below, in the binoculars of the present embodiment, the second housing 620 is rotated about the imaging unit 200 to adjust the horizontal distance between the two lens-barrels for the interpupillary adjustment.

Each of the lens-barrel rotational position detection unit 41 and the imaging unit rotational position detection unit 42 is provided with: a reflection unit 41a, 42a; and a photo-coupler 41b, 42b for receiving light irradiated onto and reflected by the reflection unit 41a, 42a.

Figure 3:
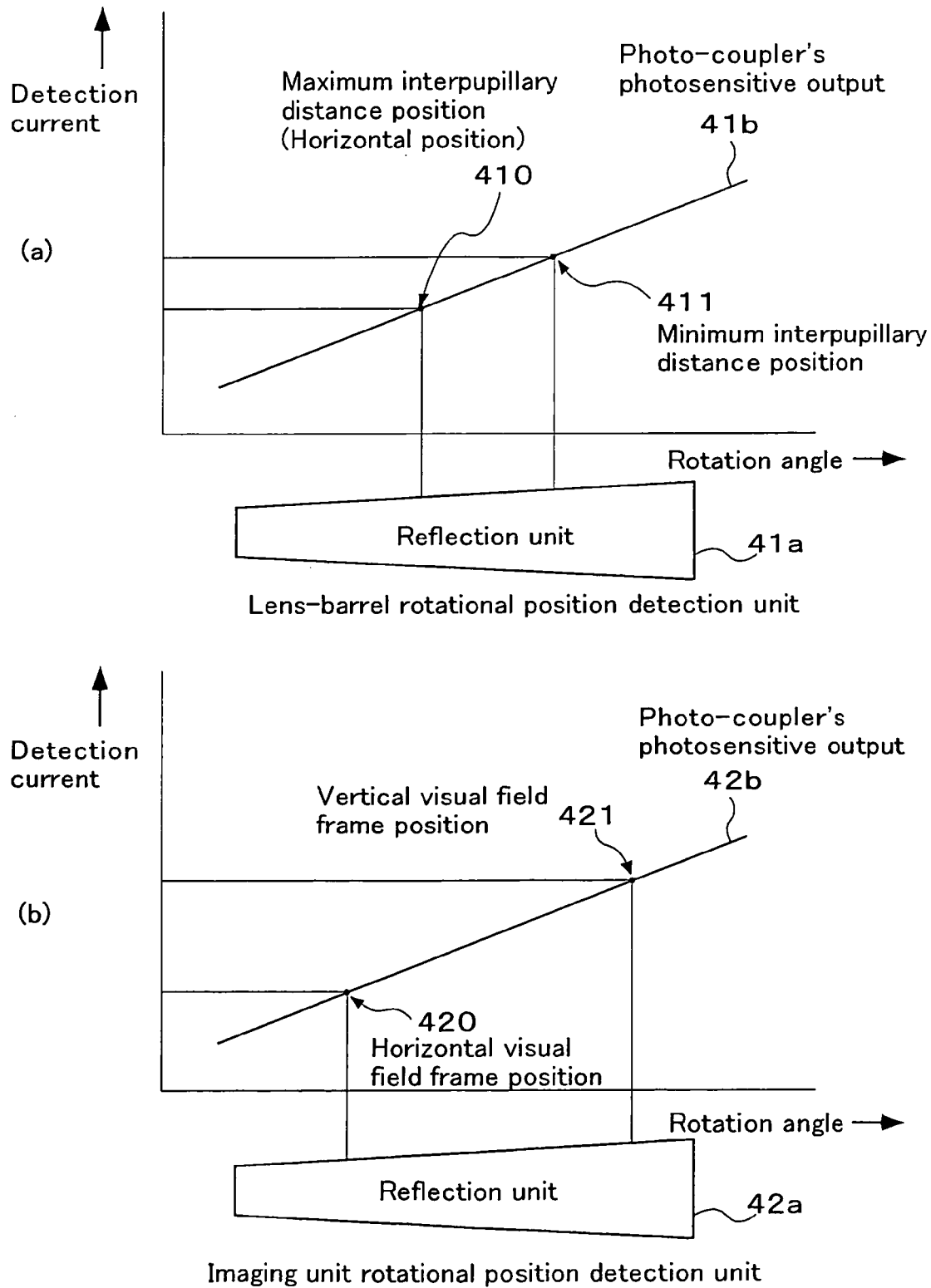
FIGS. 3(a) and 3(b) are diagrams for explaining a detection current in the present embodiment.

FIGS. 3(a) and 3(b) are diagrams for explaining detection currents obtained by the reflection units 41a and 42a and the photo-couplers 41b and 42b.

Each of the reflection units 41a and 42a has a trapezoidal shape, and is mounted on a surface of a cylinder in a direction such that the width of its area receiving light emitted from the photo-coupler 41b or 42b changes as the cylinder rotates.

The photo-couplers 41b and 42b emit light when the power button 51 is turned on, detect quantities of light (detection currents) received from the reflection unit 41a and 42a, and output the detection currents as inclination signals indicating the rotation angles to the imaging unit 200.

FIGS. 3(a) and 3(b) are graphs for explaining the detection currents. FIG. 3(a) explains the lens-barrel rotational position detection unit 41, and FIG. 3(b) the imaging unit rotational position detection unit 42. As shown in the drawings, the shapes of the reflection units 41a and 42a are formed such that the photosensitive outputs of the photo-couplers 41b and 42b change linearly depending on the rotational positions.

As shown in the figures, the shapes of the reflection unit 41a and 42a and the photo-coupler photosensitive outputs 41b and 42b change, in the lens-barrel rotational position detection unit 41, between a position (maximum interpupillary distance position) 410 at which the interpupillary distance becomes largest and a position (minimum interpupillary distance position) 411 at which the interpupillary distance becomes smallest, and, in the imaging unit rotational position detection unit 42, between a position (horizontal visual field frame position) 420 at which the visual field frame becomes horizontal and a position (vertical visual field frame position) 421 at which the visual field frame becomes vertical.

The lens-barrel rotational position detection unit 41 detects the quantity of rotation (angle) of the first housing 610 with respect to the second housing 620, and, as a result, detects the inclination of the lens-barrels that have been inclined at the time of the interpupillary adjustment.

As shown in FIGS. 1(a) and 1(b) and FIGS. 2(a), 2(b), 2(c) and 2(d), the reflection unit 41a is mounted on the cylindrical surface as a part of the first housing 610, and the photo-coupler 41b is mounted within the second housing 620.

Figure 2:
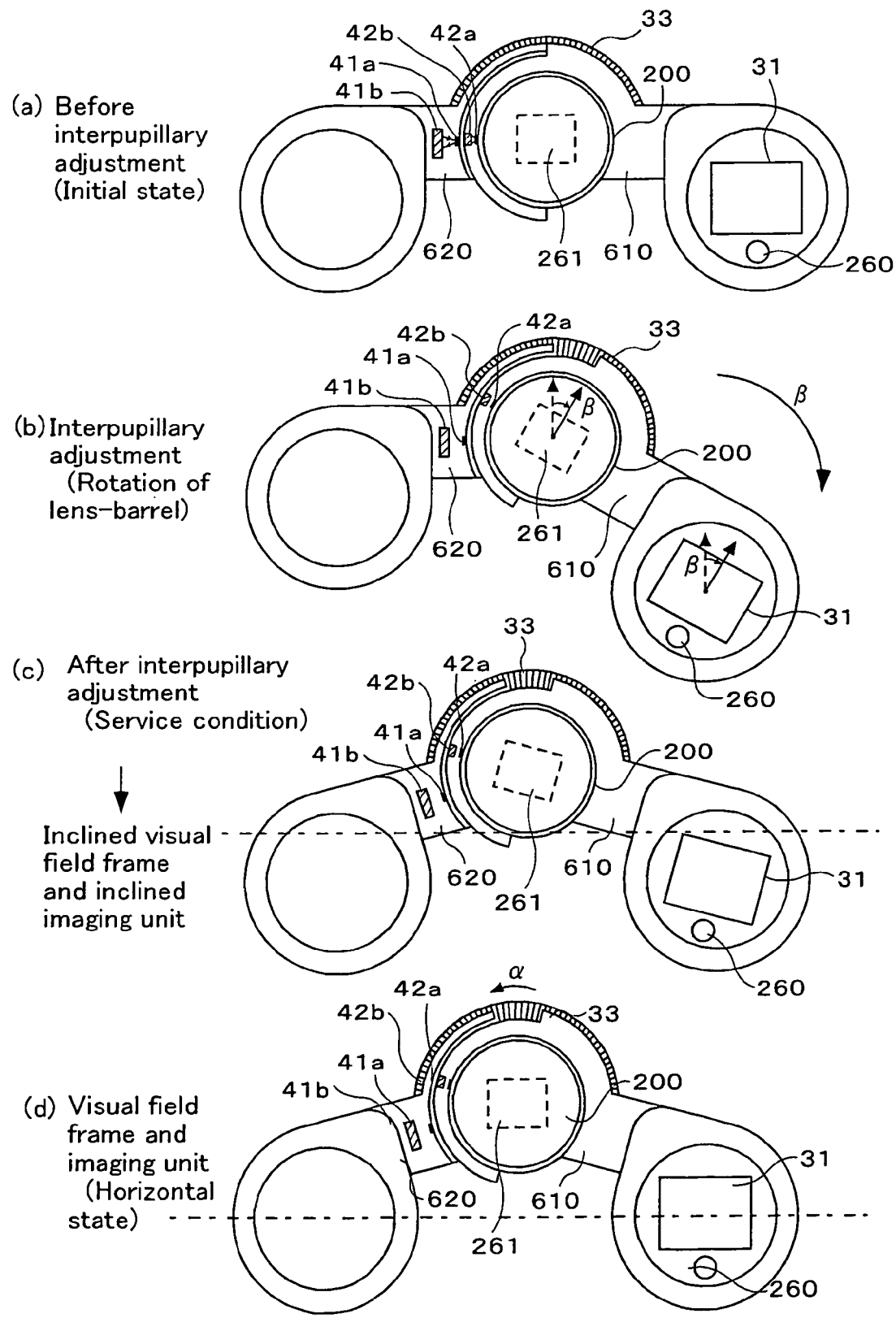
FIGS. 2(a), 2(b), 2(c) and 2(d) are views for explaining adjustment operation at the time of the interpupillary adjustment of the binoculars of the present embodiment and a method of detecting inclination.

FIG. 2(a) shows an initial state, namely a state in which the left and right lens-barrels are opened almost horizontally before performing the interpupillary adjustment. In this state, a long side of an image pickup device 261 and a long side of the visual field frame 31 are parallel with each other.

FIG. 2(b) shows a state (lens-barrel rotation) in which the lens-barrels are inclined for the interpupillary adjustment. For example, when the first housing 610 is rotated through β clockwise with respect to the second housing 620 as shown in the figure, the photo-coupler 41b outputs the detection current caused by the reflection unit 41a to the below-mentioned CPU of the imaging unit 200. Here, the detection current changes depending on the rotation of the first housing 610.

FIG. 2(c) shows a state (service condition) in which both the lens-barrels of the binoculars are made horizontal while keeping the relatively-inclined state of the lens-barrels of FIG. 2(b). And, FIG. 2(d) shows a state (horizontal state) in which the visual field frame 31 is made horizontal while keeping the lens-barrels horizontal as in FIG. 2(c).

In actual use, the binoculars are positioned such that both the lens-barrels become horizontal as shown in FIG. 2(d). Accordingly, the rotation angle β of the first housing 620, which has been detected by the lens-barrel rotational position detection unit 41, is corrected to be half (β/2) for later control use.

The imaging unit rotational position detection unit 42 detects the quantity of rotation (angle) of the visual field frame 31 and the imaging unit 200 with respect to the first housing 610, and detects the inclination of them when these are rotated by means of the rotatable knob 33.

As shown in FIGS. 1(a) and 1(b) and FIGS. 2(a), 2(b), 2(c) and 2(d), the reflection unit 42a is mounted on the cylindrical surface as a part of the imaging unit 200, and the photo-coupler 42b is mounted on the first housing 610.

Figure 4:
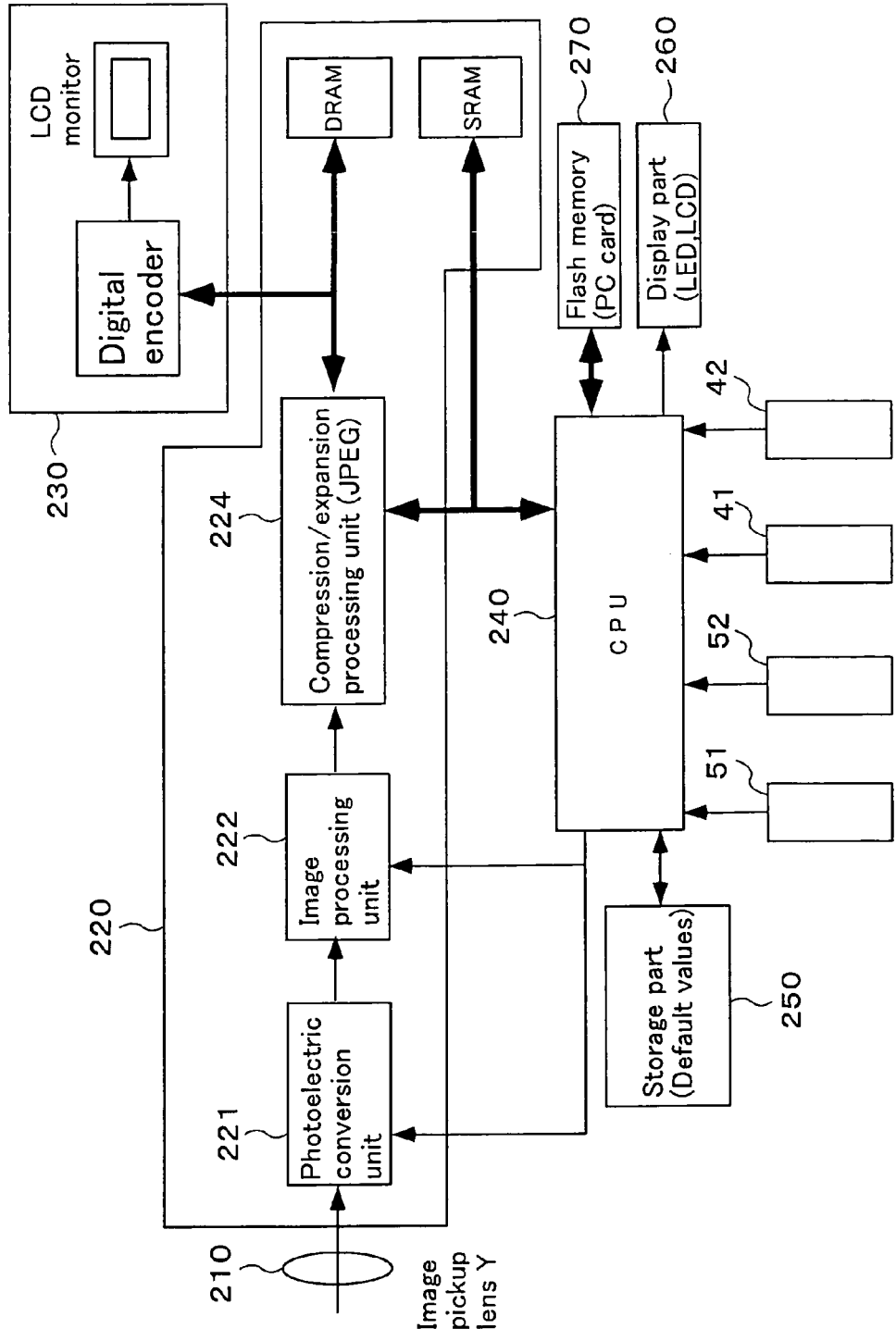
FIG. 4 is a functional block diagram showing an imaging unit in the present embodiment.

Next, will be described functions of the imaging unit 200. FIG. 4 is a functional block diagram showing the imaging unit 200.

Although, in the example of the present embodiment, a flash memory is employed as the recording unit 270, the recording unit is not limited to this.

As shown in the figure, the imaging unit 200 is provided with the image pickup optical system 210 having an image pickup lens; an image processing part 220, the flash memory 270 for recording an image after image processing, an image signal output part 230 for outputting an image processed in the image processing part 220 to a monitor or the like, a CPU 240 for controlling operation of the mentioned components; a storage part 250, and a display part 260.

The storage part 250 stores values (default values) calculated from the respective inclination signals received from both detection units 41 and 42 at the time the imaging unit 200 is in predetermined specific states (rotation angles). In the present embodiment, the storage part 250 stores values at the time the imaging unit 200 is horizontal (rotation angle of 0 degree) and vertical (rotation angle of 90 degrees).

The CPU 240 is connected to the operation unit 500 and the detection unit 400, and controls the functional units of the imaging unit 200 in accordance with an operation instruction received through the operation unit 500, output signals received from the detection unit 400 and programs stored in an internal program memory.

In detail, when the power button 51 is turned on, the CPU 240 makes the photo-couplers 41b and 42b start emitting light. Then, receiving the inclination signals outputted from the detection unit 400, the CPU 240 calculates the inclination of the imaging unit 200 at the present time, based on the received signals and referring to the default values stored in the storage part 250. The CPU 240 holds the calculated inclination in a memory (not shown). Further, receiving a depression of the record button 52, the CPU 240 makes the image processing part 220 (which will be described below) operate. Further, based on the calculated inclination of the imaging unit 200, the CPU 240 controls operation of the display part 260. The calculated inclination (quantity of rotation) of the imaging unit 200 is held in the memory (not shown).

Here, when an inclination β is obtained from the inclination signal received from the photo-coupler 41b and an inclination α from the photo-coupler 42b, then the CPU 240 calculates the inclination of the imaging unit 200 at that point as β/2+α.

The image processing part 220 is provided with the photoelectric conversion unit (CCD) 221 that converts light inputted through the image pickup lens into an electric signal when the record button 52 is pushed down, an image read unit 222 that reads pixel data converted in the photoelectric conversion unit 221 along the X-Y directions, a compression/expansion processing unit 224 that performs compression/expansion processing on an read image, and the flash memory 270 for recording an image performed the compression/expansion processing. Further, the image processed in the compression/expansion unit 224 is outputted also to the image signal output part 230.

Here, the photoelectric conversion unit 221 is arranged to have a figure similar to the visual field frame 31.

In the present embodiment, the image processing part 220 records X-Y address data of pixel data read by the image read unit 222 into the flash memory 270, while controlling the read direction in accordance with a horizontal position signal and a vertical position signal (which the CPU 240 holds in the memory) of the imaging unit 200. Or, the image processing part 220 outputs the X-Y address data to the image signal output part 230.

Figure 5:
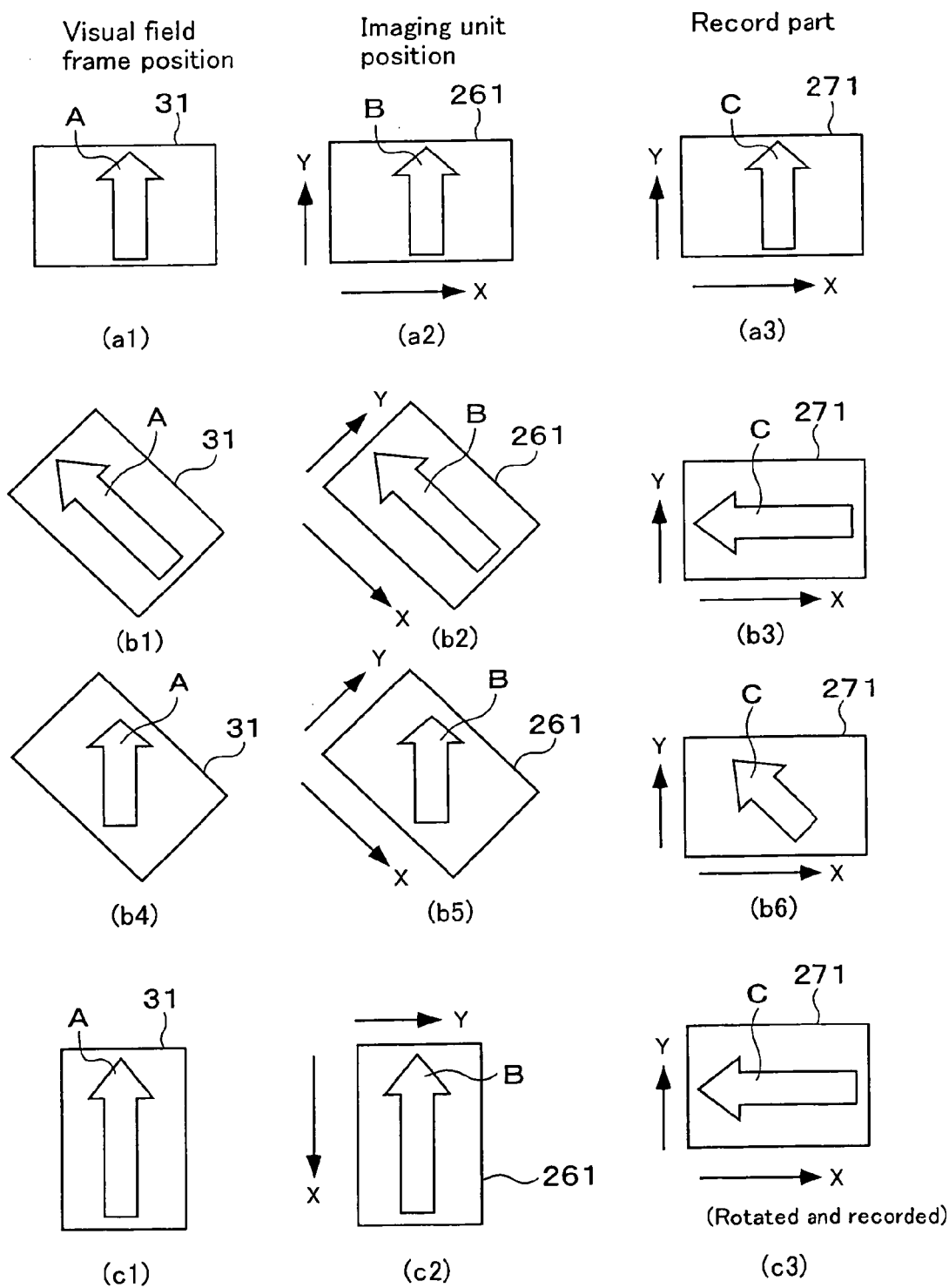
FIGS. 5(a1), 5(a2), 5(a3), 5(b1), 5(b2), 5(b3), 5(b4), 5(b5), 5(b6), 5(c1), 5(c2) and 5(c3) are diagrams for explaining a visual field frame, the imaging unit and recording directions.

FIGS. 5(a1), 5(a2), 5(a3), 5(b1), 5(b2), 5(b3), 5(b4), 5(b5), 5(b6), 5(c1), 5(c2) and 5(c3) are diagrams for explaining a relation between the inclination of the visual field frame 31 and the imaging unit 200 and the direction of recording into the flash memory 270.

As shown in FIGS. 5(a1), 5(a2), 5(a3), 5(b1), 5(b2), 5(b3), 5(b4), 5(b5), 5(b6), 5(c1), 5(c2) and 5(c3), when the record button 52 is pushed down, X-Y address data read by the image read unit 222 are recorded into the flash memory 270. In the following, the case to record into the flash memory 270 will be taken for instance and described, since the process of outputting to the image signal output part 230 is fundamentally the same.

Among these figures, FIGS. 5(a1), 5(b1), 5(b4) and 5(c1) show objects A seen through the visual field frame 31.

FIGS. 5(a2), 5(b2), 5(b5) and 5(c2) show states in which the objects A shown in FIGS. 5(a1), 5(b1), 5(b4) and 5(c1) are taken as respective images B in the image pickup device 261.

FIGS. 5(a3), 5(b3), 5(b6) and 5(c3) show states in which the images B shown in FIGS. 5(a2), 5(b2), 5(b5) and 5(c2) have been recorded as respective recorded images C in a record area 271 of the flash memory 270.

For example, in the case where an image is picked up when the imaging unit 200 is in an inclined state, the visual field frame 31 is controlled to be inclined in the same way as the imaging unit 200. In that case, an image recorded in the flash memory 270 as the recording unit is not an inclined image, but is recorded in a state that the imaging 200 is in the initial state with X indicating the lengthwise direction and Y the widthwise direction of the imaging unit 200.

Namely, in the present embodiment, the inclination of the imaging unit 200 follows the inclination of the visual field frame 31. Thus, in the case where the direction of the visual field frame 31 is horizontal as shown in FIG. 5(a1), the imaging unit 200 is also horizontal as shown in FIG. 5(a2). And, as shown in FIG. 5(a3), the image is recorded as it is into the record area 271.

In the case where the direction of the visual field frame 31 is inclined as shown in FIGS. 5(b1) and 5(b4), the imaging unit 200 also is inclined at the same angle as shown in FIGS. 5(b2) and 5(b5). And, the respective images are recorded into the record area 271 of the flash memory 270 as shown in FIGS. 5(b3) and 5(b6) with X indicating the lengthwise direction and Y the widthwise direction of the imaging unit 200.

Further, in the case where the direction of the visual field frame 31 is rotated through 90 degrees from the initial state as shown in FIG. 5(c1), the imaging unit 200 is also rotated through 90 degrees as shown in FIG. 5(c2). The image recorded into the record area 271 of the flash memory 270 as shown in FIG. 5(c3) with X indicating the lengthwise direction and Y the widthwise direction of the imaging unit 200.

According to the above-described arrangement of the present embodiment, at the time of recording, control can be performed such that an image pickup result is recorded in a state rotated to the direction corresponding to the rotation of the imaging unit 200.

The display part 260 is provided with an LCD, an LED or the like, and is positioned, for example, at an eyepiece 11 in the outside of the visual field frame as shown in FIG. 2(a).

When the inclination of the imaging unit 200, which is calculated by the CPU 240 using the inclination signals received from the detection units 41 and 42, coincides with a default value stored in the storage part 250, the display part 260 displays that fact. For example, the display part 260 can operate such that: in the case where the inclination of the imaging unit 200 is horizontal, a red light is turned on; in the case where the inclination is vertical, a green light is turned on; and in the other case, no light is turned on. Of course, the method of displaying is not limited to this. For example, the angle of the inclination calculated by the CPU 240 may be displayed digitally.

In the binoculars according to the present embodiment, the image pickup direction of the imaging unit 200 (the visual field frame 31) can be changed freely by rotating the imaging unit 200 (the visual field frame 31) through the rotatable knob 33 and/or by rotating the housings 610 and 620 relatively to each other. On the other hand, sometimes it is difficult for the user to judge whether the imaging unit 200 is in the direction he intended. Owing to display of the display part 260, the user can know that the imaging unit 200 is in the desired direction.

Next, referring to FIGS. 2(a), 2(b), 2(c) and 2(d), will be described adjustment operation for adjusting the imaging unit 200 to be horizontal at the time of the interpupillary adjustment.

In the present embodiment, starting from the state that the imaging unit 200 and the visual field frame 31 are horizontal and the first and second housings 610, 620 are not rotated with respect to each other (the initial state shown in FIG. 2(a)), the user first inclines the lens-barrels to adapt them for his interpupillary distance. Namely, the first housing 610 is rotated with respect to the second housing 620 through an angle β (≠0 degree, ≠90 degrees) (lens-barrel rotation shown in FIG. 2(b)). Then, both the lens-barrels are made horizontal, to be in a service condition (the service condition shown in FIG. 2(c)).

The photo-coupler 41b detects this rotation, and sends an inclination signal indicating the detected rotation to the CPU 240. Then, the CPU 240 calculates the current inclination of the lens-barrels (i.e., the inclination of the imaging unit 200) as β/2.

Next, in the service condition, the user rotates the rotatable knob 33 through an angle α to rotate the visual field frame 31 and the imaging unit 200.

The photo-coupler 42b detects rotation of the imaging unit 200 accompanying the rotation of the rotatable knob 33, and sends an inclination signal indicating the detected rotation to the CPU 240.

The CPU 240 calculates the inclination of the imaging unit 200 at that point as β/2+α, using the inclination α calculated from the inclination signal from the photo-coupler 42b and the inclination β/2 calculated based on the signal from the photo-coupler 41b.

When the inclination becomes 0, i.e., when α=−β/2 is satisfied, the CPU 240 judges that the imaging unit 200 becomes horizontal, and turns on the red light in the display part 260.

When the display part 260 is turned on, the user knows that the imaging unit 200 becomes horizontal, and stops rotating the rotatable knob 33 (horizontal state shown in FIG. 2(d)).

According to the above-described arrangement, the present embodiment provides a pair of binoculars in which the inclination of the visual field frame 31 is interlocked with the inclination of the imaging unit 200, enabling record of an image taken in any direction.

The user can take an image at any angle by rotating the rotatable knob 33 to incline the imaging unit 200.

Further, in the present embodiment, recording is performed while the inclination of the imaging unit 200 is interlocked with the inclination of the visual field frame 31. Thus, from the direction of the visual field frame 31, the user can recognize the inclination of the imaging unit 200 and the image pickup record area.

Further, even when the imaging unit 200 is inclined contrary to the user's will as a result of, for example, the interpupillary adjustment, the user can realize a desired state, for example, a horizontal state, of the imaging unit 200 easily by rotating the rotatable knob 33 to rotate the imaging unit 200 and the visual field frame 31. Further, owing to the display part, it is possible to know accurately and easily that the imaging unit 200 is in a desired state.

Thus, according to the present embodiment, it is not necessary to rotate the main body of the binoculars depending on an image pickup object. Further, even when the visual field frame 31 of an observation optical system is inclined as a result of the interpupillary adjustment, it is possible to take an image in any desired direction by rotating the visual field frame 31.

Although the present embodiment is arranged such that the rotatable knob 33 is fixed to the housing 600 as shown in FIG. 1(a), the form of the rotatable knob 33 is not limited to this. For example, a part of the visual field frame 31 may be protruded in a shape of a tongue out of the housing 600 to form the rotatable knob 33. At the time of use, the tongue is moved to rotate the visual field frame 31 and the imaging unit 200.

Further, indices showing rotation angles may be provided at suitable locations in order to know the inclination of the housing 600 cased by the interpupillary adjustment or a rotation status of the visual field frame 31. Or, in order to display digitally the inclination of the visual field frame 31 and the imaging unit 200 from the horizontal positions, a display part may be provided on the housing and the inclination calculated by the CPU 240 may be displayed.

Further, the rotational position detection units and the display means may not be provided, and an observer may grasp the quantity of rotation with his eyes.

Further, the present embodiment has been described taking the example in which the imaging unit and the visual field frame are interlocked with each other through gears or the like. However, it is possible to provide rotational position detection units and driving units such as motors for the visual field frame and/or the imaging unit. The driving units can be controlled based on detection results of the detection units.

In that case, a control part is provided for controlling the driving units based on the detected information.

Second Embodiment

While in the first embodiment, the imaging unit and the visual field frame are moved by hand, in a second embodiment, the imaging unit and the visual field frame are moved by a motor.

The present embodiment will be described also taking an example of a pair of binoculars as an optical apparatus. However, the present invention can be applied to an optical apparatus such as a microscope other than a pair of binoculars. Further, the mechanism for adjusting the inclination of the imaging unit and the visual field frame can be applied to a monocular apparatus too.

Figure 6:
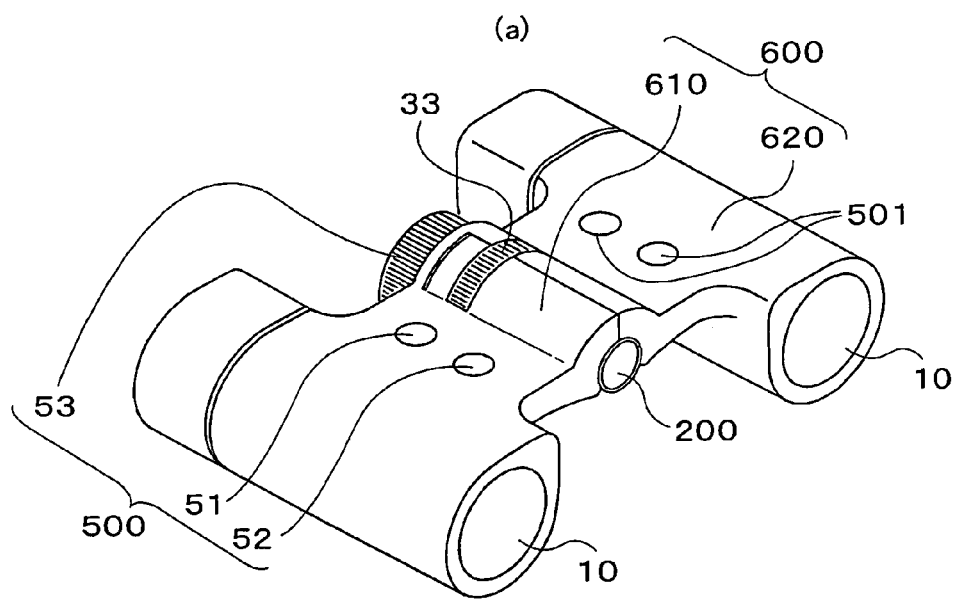
FIG. 6(a) is an external view of a pair of binoculars according to a second embodiment of the present invention, and FIG. 6(b) a schematic view showing inner structure of the binoculars of the second embodiment.
Figure 6:
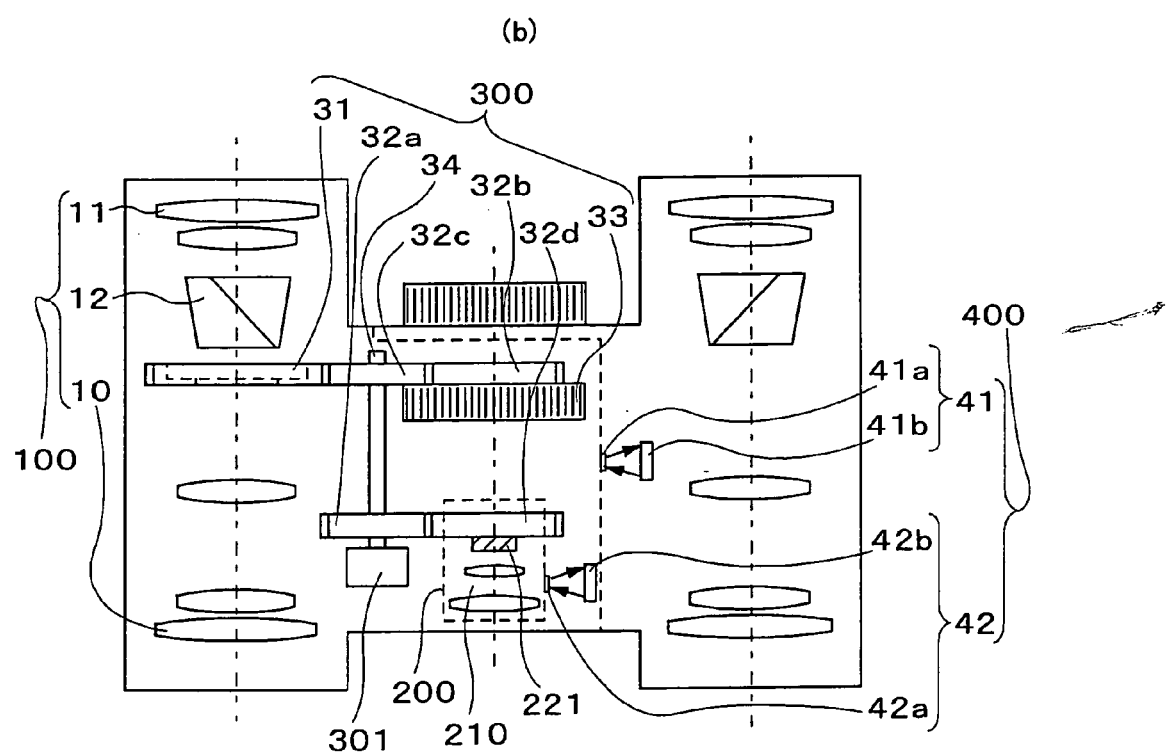

FIG. 6(a) is an external view of a pair of binoculars according to the present embodiment, and FIG. 6(b) is a schematic view showing the inner structure of the binoculars.

The binoculars of the present embodiment differ from the first embodiment in that the binoculars of the present embodiment have a motor 301. Description of the parts common to the first embodiment will be omitted.

As shown in FIG. 6(b), the binoculars of the present embodiment is provided with a binocular optical system 100 having a left and right pair of observation optical systems for observing an object, an imaging unit 200 for taking a picture, a mechanical unit 300 for interlocking the imaging unit 200 and a visual field frame 31 that delimits an observation area, a detection unit 400 for detecting an inclination of the imaging unit 200, an operation unit 500 for receiving input of an operation instruction, the motor 301 for rotating the imaging unit 200 about the optical axis of an image pickup optical system, and a housing 600 that stores the above-mentioned components.

The mechanical unit 300 is provided with the visual field frame 31, a rotatable knob 33, gears 32a, 32b, 32c and 32d, a coupling gear shaft 34, and the motor 301. In the present embodiment, the motor 301 moves the imaging unit 200 and the visual field frame 31 being interlocked with each other. Thus, the rotatable knob 33 can be dispensed with. However, the rotatable knob 33 may be provided in order that a user can choose between a manual mode and an automatic mode by the motor. The present embodiment will be described taking an example having both modes.

According to the above-described arrangement, the visual field frame 31 and the imaging unit 200 can be rotated simultaneously through the same angle in the same direction, being driven by the motor 301. Driving by the motor 301 is transmitted to the visual field frame 31 through the gear 32c, and to the circumferential gear portion 32d of the imaging unit 200 through the coupling gear shaft 34 and the gear 32b. Further, the present embodiment uses values detected in the detection unit 400 that is also mounted in the first embodiment.

Similarly to the first embodiment, the detection unit 400 is provided with a lens-barrel rotational position detection unit 41 and an imaging unit rotational position detection unit 42.

Now, will be described a method of operating the binoculars of the present embodiment.

First, a power switch is turned on. Next, in the case where the interpupillary adjustment has been performed, the lens-barrel rotational position detection unit 41 detects the rotational position between the left and right lens-barrels caused by the interpupillary adjustment. Then, the detected value is sent to the CPU.

The angle between the left and right lens-barrels before the interpupillary adjustment is taken as a reference value. And, the quantity of rotation is calculated by comparing the detected value with the reference value. Then, based on the calculated value, driving quantity by the motor 301 is controlled to rotate the imaging unit 200 and the visual field frame 31.

At that time, the rotational position of the imaging unit 200 is detected by the imaging unit rotational position detection unit 42. When the detected value becomes a value corresponding to the above-calculated quantity of rotation of the lens-barrels, then the rotation of the imaging unit 200 is stopped. At that time, since the imaging unit 200 and the visual field frame 31 are interlocked with each other through the coupling gear shaft 34 as shown in FIG. 6(b), the imaging unit 200 and the visual field frame 31 are rotated being interlocked with each other.

In the above example, the imaging unit rotational position detection unit 42 is provided and the detected value in the imaging unit rotational position detection unit 42 is used for stopping the rotating operation of the imaging unit 200 and the visual field frame 31. However, it is possible to provide only the lens-barrel rotational position detection unit 41. Then, a value detected in the lens-barrel rotational position detection unit 41 is used for controlling the driving quantity of the motor 301.

Further, in the above example, the coupling gear shaft 34 is used to interlock the imaging unit 200 with the visual field frame 31. However, it is possible to mount an imaging unit rotating motor and a visual field frame rotating motor to rotate the imaging unit 200 and the visual field frame 31 by controlling the motors based on detected values, respectively.

Further, applying the present embodiment, it is possible to take a picture according to the user's preference by rotating the imaging unit 200 to any rotational position as described below.

As shown in FIG. 6(a), in this application, an operation unit 501 having two buttons is provided for receiving an instruction as to the direction of rotation. Depending on an instruction received through the operation unit 501, the motor 301 is driven to rotate the visual field frame 31.

When an operation of one button of the operation unit 501 is received, the motor 301 is driven to rotate the imaging unit 200 toward a direction such that the long sides of a CCD 221 of the imaging unit 200 become vertical from a horizontal state. On the other hand, when an operation of the other button of the operation unit 501 is received, the motor 301 is driven to rotate the imaging unit 200 toward a direction such that the long sides of the CCD 221 of the imaging unit 200 become horizontal from a vertical state.

According to such rotation of the imaging unit 200, it is possible to take a picture more efficiently depending on a state of a subject. For example, in the case of taking a picture of a vertically oriented subject, the user using the binoculars of the present embodiment can push one button of the operation unit 501 to rotate the imaging unit 20 such that the long sides of the CCD 221 become vertical. Then, it is possible to take a picture of the vertically oriented subject using the pixels of the CCD 221 more effectively.

In that case, since also the visual field frame 31 rotates being interlocked with the imaging unit 200 as described above, the user can take a picture while confirming the picture-taking area through the visual field frame 31. Here, rotation of the imaging unit 200 can be stopped at any position. Thus, it is possible to take a picture with the CCD 221 in an inclined state.

According to the present application, similarly to the case where the imaging unit 200 and the visual field frame 31 are rotated manually, it is possible to take a picture of a vertically oriented subject efficiently, using a pair of binoculars provided with an ordinary CCD 221 arranged such that the long sides of the CCD 221 are horizontal, and holding the binoculars such that the left and right eyepiece parts are in a state of ordinary use.

Further, according to the present application, similarly to the manual operation, by employing an arrangement in which the imaging unit 200 can be rotated to and stopped at any position even if there is no visual field frame 31, it is possible to realize a pair of binoculars having an arrangement that is suitable for taking a picture of a vertically oriented subject.

Third Embodiment

Next, will be described a third embodiment. This embodiment is an example of biaxial-type binoculars provided with left and right lens-barrels that are rotatable respectively at the left and right ends of the main body.

Figure 7:
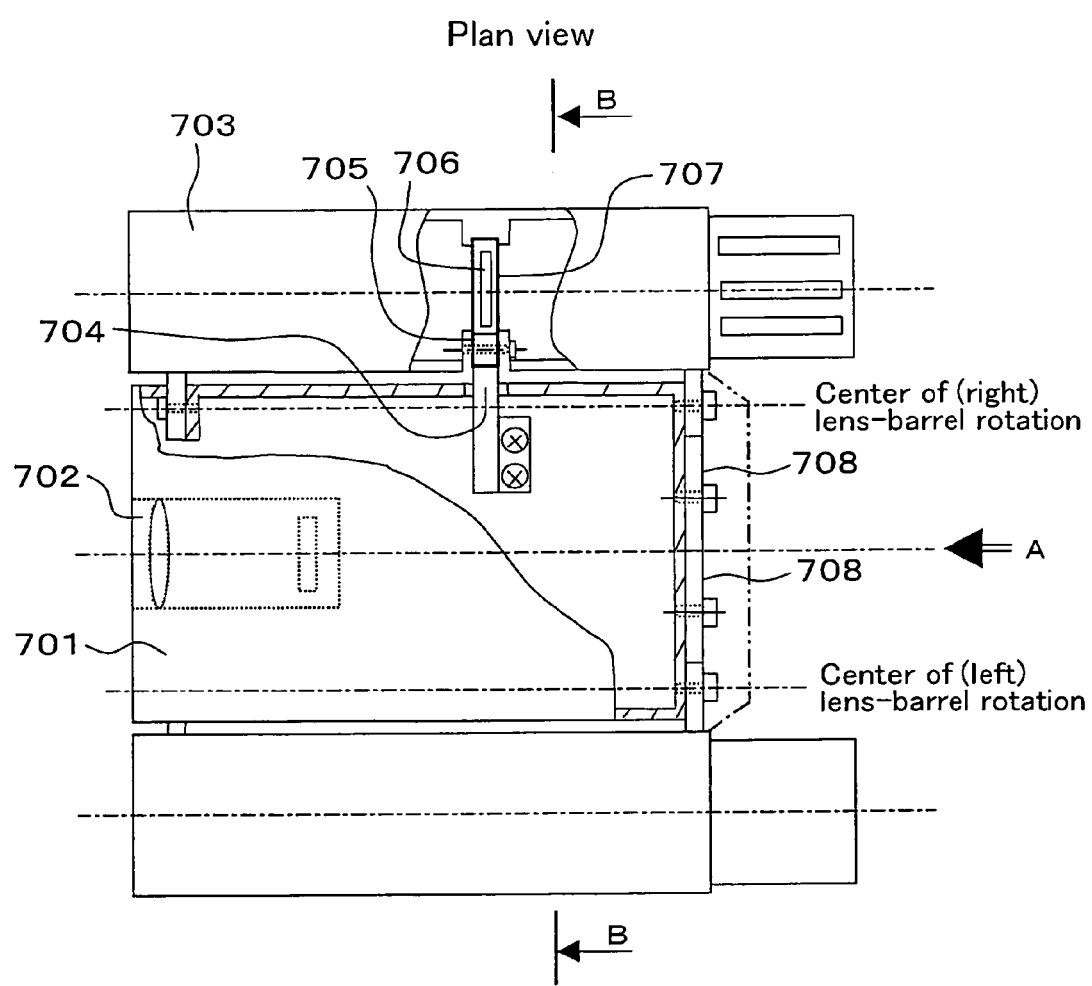
FIG. 7 is a schematic view showing a pair of binoculars according to a third embodiment of the present invention.

FIG. 7 is a schematic view showing a pair of binoculars according to the present embodiment, seen from the above.

A main body 701 of the binoculars of the present embodiment is provided with an imaging unit 702, coupling gears C 704 (non-rotatable), lens-barrels 703 (left and right lens-barrels of the same structure), coupling gears B 705, a visual field frame 706, a visual field frame holder 707, and coupling gears A 708.

The coupling gears B 705 provided in the left and right lens-barrels 703 are rotatably coupled with the respective coupling gears C 704 fixedly provided in the main body 701. And, inside one of the left and right lens-barrels 703, is provided the visual field frame 706 fixed in the visual field frame holder 707. The visual field frame holder 707 has a circular shape, the outer circumference of the holder has the structure of a gear, and this gear is in contact with a coupling gear B 705.

Accordingly, when this lens-barrel 703 is rotated with respect to the main body 701 for the interpupillary adjustment, then also the visual field frame holder 707 is rotated. Disregarding such rotation by means of these gears, the long sides of the visual field frame 706 provided in the visual field frame holder 707 are adjusted to be always horizontal. As a result, even when the lens barrel 703 is rotated for the interpupillary adjustment, the visual field frame 706 is always held in a constant state without being inclined.

Figure 8:
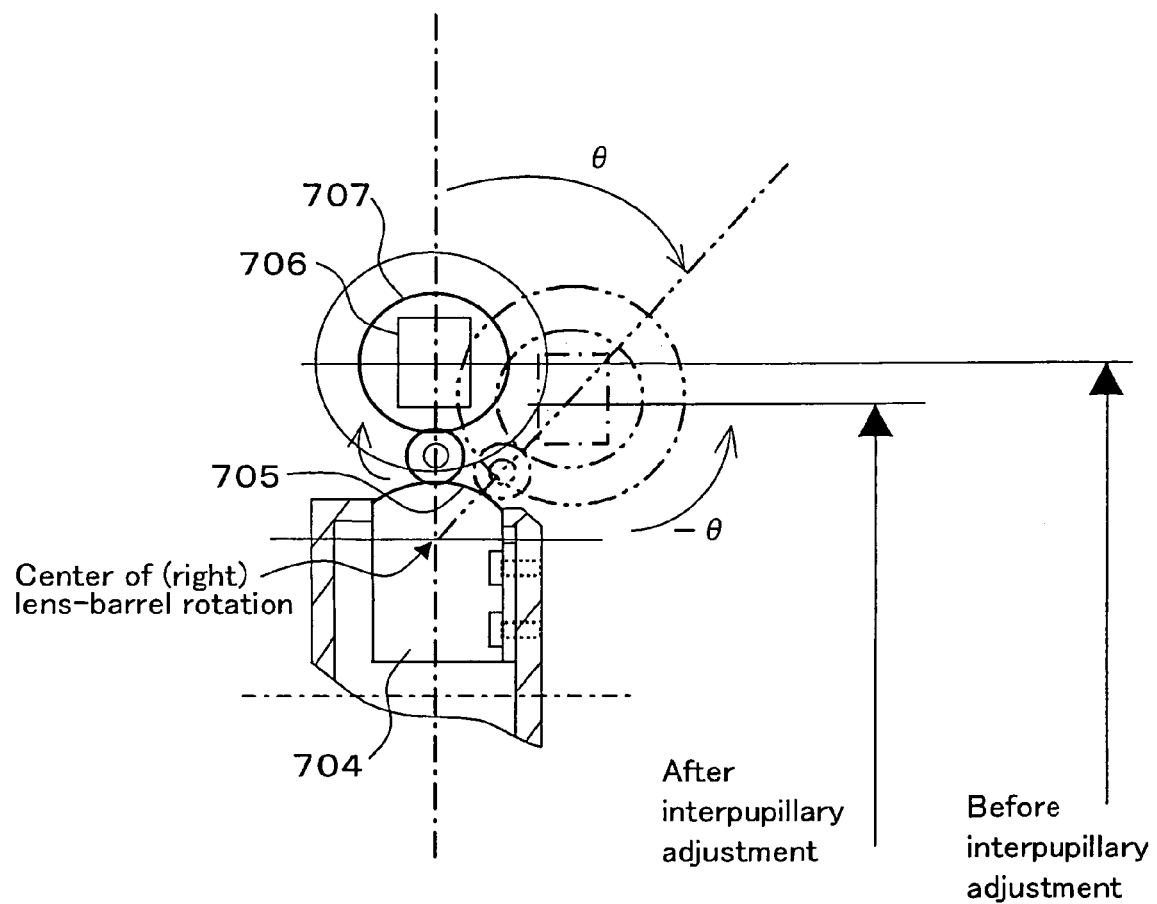
FIG. 8 is a schematic view taken along the line B-B in FIG. 7.

FIG. 8 is a schematic view taken along the line B-B in FIG. 7, and shows the lens-barrel 703 on the side having the visual field frame 706.

The outer circumference of the visual field frame holder 707 holding the visual field frame 706 has the gear structure and is coupled with the coupling gear C 704 fixedly provided on the side of the main body. In FIG. 8, the visual field frame 706 shown in a solid line shows a position in a state where the left and right lens-barrels are completely opened. In this state, the visual field frame 706 is mounted so that its lengthwise direction becomes horizontal.

Then, it is assumed that, for the interpupillary adjustment, the lens-barrel 703 having the visual field frame holder 707 holding the visual field frame 706 is rotated through an angle θ about the center of rotation of the lens-barrel.

The coupling gear B 705 rotates in a clockwise direction in the figure along the coupling gear C 704. Then, the visual field frame holder 707 coupled with the coupling gear B 705 is rotated counterclockwise through an angle −θ.

Owing to the respective rotations of the gears in the different directions, it is possible to perform the interpupillary adjustment, while keeping the state of the visual field frame 706 as shown in dashed lines in FIG. 8.

Further, when the interpupillary adjustment is performed is adjusted in the binoculars of the present embodiment, both the lens-barrels 703 rotate through the same angle with respect to the main body 701. This operation is realized by interlocking the left and right lens-barrels 703 with each other through the coupling gears A 708.

Figure 9:
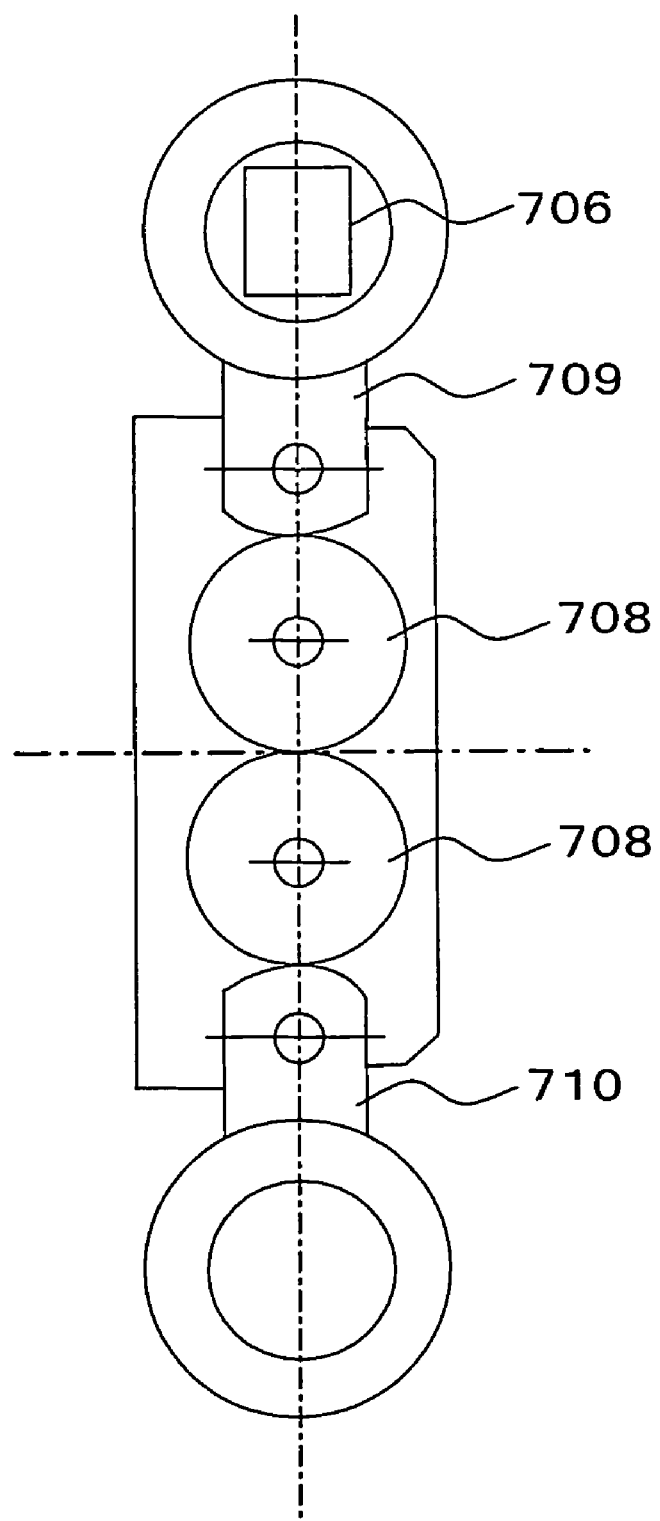
FIG. 9 is a schematic view seen from the direction A in FIG. 7.

FIG. 9 is a schematic view seen from the direction A in FIG. 7.

As shown in the figure, the coupling gears A 708 are two gears provided on the eyepiece side of the main body 701. These two gears are in contact with each other at the center of the main body 701. Further, left and right lens-barrel arms 709 and 710 are coupled respectively with the gear portions opposite to this contact portion. As a result, the same quantity of rotation as the quantity of rotation of one lens-barrel 703 is transmitted to the gear of the other lens-barrel 703, and thus the left and right lens-barrels 703 rotate by the same quantity of rotation.

According to the above-described arrangement, the imaging unit 702 placed in the main body 701 is not inclined by the interpupillary adjustment, and is held such that the lengthwise direction of the CCD is always horizontal. Without the above-described arrangement, sometimes quantities of rotation of the left and right lens-barrels with respect to the main body become different from each other, and the imaging unit 200 placed in the main body is inclined.

The biaxial-type binoculars of the present embodiment is constructed such that the main body 701 and the visual field frame holder 707 are coupled through the gears as described above, and the lengthwise direction of the visual field frame 706 is always held horizontal when the interpupillary adjustment is performed. As a result, even when the interpupillary adjustment is performed, the imaging unit 702 and the visual field frame 706 are interlocked with each other to keep their lengthwise directions horizontal.

As described above, according to the present invention, in an optical apparatus having an image pickup function and having a visual field frame in the visual field, it is possible to correct the inclination of the visual field frame easily.

The invention claimed is:

1. An optical apparatus having an image pickup function, comprising:
    a binocular optical system that has a left and right pair of observation optical systems housed respectively in left and right lens-barrels, and is able to perform an interpupillary adjustment by axially rotating said left and right lens-barrels;
    an imaging unit that has a photoelectric conversion unit having an angle of view corresponding to a real visual field of an image observed by said binocular optical system, with the imaging unit being arranged between said left and right lens-barrels; and
    a visual field frame that has almost the same shape as said photoelectric conversion unit, is provided in at least one of said lens-barrels to be rotatable about an optical axis of the observation optical system;
wherein:
    said optical apparatus further comprises:
    an interlocking portion provided between said lens-barrel having the visual field frame and said imaging unit, with said interlocking portion rotate said visual field frame and said imaging unit in the same direction through the same angle.

2. An optical apparatus according to claim 1, further comprising:
    a detection means that detects a quantity of rotation of said photoelectric conversion unit about an optical axis of an image pickup optical system of said imaging unit;
    a display means; and
    a control means that makes said display means give an indication when the quantity of rotation of said imaging unit, which is detected by said detection means, becomes a predetermined value.

3. An optical apparatus according to claim 2, wherein:
    said predetermined value is a value indicating that an inclination of long sides of said imaging unit is horizontal or vertical.

4. An optical apparatus having an image pickup function, comprising:
    a binocular optical system that has a left and right pair of observation optical systems housed respectively in left and right lens-barrels, and is able to perform an interpupillary adjustment by axially rotating said left and right lens-barrels;
    an imaging unit that has a photoelectric conversion unit having an angle of view corresponding to a real visual field of an image observed by said binocular optical system, with the imaging unit being arranged between said left and right lens-barrels; and
    a visual field frame that has almost the same shape as said photoelectric conversion unit, is provided in at least one of said lens-barrels to be rotatable about an optical axis of the observation optical system;
wherein:
    said optical apparatus further comprises:
    a detection means that detects a quantity of rotation of said photoelectric conversion unit about an optical axis of an image pickup optical system of said imaging unit;
    a driving unit that drives rotation of said photoelectric conversion unit and/or rotation of said visual field frame; and
    a control unit that makes said driving unit operate, based on information detected by said detection means.

5. An optical apparatus according to claim 4, wherein:
    as said driving unit, separate driving units are provided for rotating said photoelectric conversion unit and said visual field frame respectively;
    the driving unit for driving rotation of said photoelectric conversion unit is provided between said left and right lens-barrels; and
    the driving unit for driving rotation of said visual field frame is provided in the lens-barrel in which said visual field frame is provided.

6. An optical apparatus having an image pickup function comprising:
    a left and right pair of observation optical systems;
    a left and right pair of lens-barrels having said left and right observation optical systems, respectively;
    an imaging unit that has a photoelectric conversion unit having an angle of view corresponding to a real visual field of an image observed by said observation optical systems, is provided between said left and right lens-barrels, and has an image pickup' optical system provided in front of said photoelectric conversion unit;
    a rotation mechanism that rotates at least said photoelectric conversion unit about an optical axis of said image pickup optical system;
    a visual field frame provided in at least one of said left and right lens-barrels, with said visual field frame being rotatable about an optical axis of said observation optical system; and
    a driving unit that rotate said imaging unit and said visual field frame in a same direction through a same angle.

7. An optical apparatus having an image pickup function comprising:
    a left and right pair of observation optical systems;
    a left and right pair of lens-barrels having said left and right observation optical systems, respectively;
    an imaging unit that has a photoelectric conversion unit having an angle of view corresponding to a real visual field of an image observed by said observation optical systems, is provided between said left and right lens-barrels, and has an image pickup optical system provided in front of said photoelectric conversion unit;

a rotation mechanism that rotates at least said photoelectric conversion unit about an optical axis of said image pickup optical system;

a visual field frame provided in at least one of said left and right lens-barrels, with said visual field frame being rotatable about an optical axis of said observation optical system; and a driving unit that rotate said imaging unit and said visual field frame in a same direction through a same angle, wherein:

said driving unit is a motor; and said rotation mechanism is equipped with a plurality of gears.

8. An optical apparatus having an image pickup function comprising:

a left and right pair of observation optical systems;

a left and right pair of lens-barrels having said left and right observation optical systems, respectively;

an imaging unit that has a photoelectric conversion unit having an angle of view corresponding to a real visual field of an image observed by said observation optical systems, is provided between said left and right lens-barrels, and has an image pickup optical system provided in front of said photoelectric conversion unit;

a rotation mechanism that rotates at least said photoelectric conversion unit about an optical axis of said image pickup optical system;

a visual field frame provided in at least one of said left and right lens-barrels, with said visual field frame being rotatable about an optical axis of said observation optical system;

a driving unit that rotate said imaging unit and said visual field frame in a same direction through a same angle; and operation switches for instructing operation of said driving unit, to start and stop rotation of said imaging unit.

\* \* \* \* \*